United States Patent [19]

Juergens et al.

[11] Patent Number: 4,592,972
[45] Date of Patent: Jun. 3, 1986

[54] VIBRATION-RESISTANT BATTERY ASSEMBLY

[75] Inventors: Tristan Juergens, Conifer; Hugo Tesch, Castle Rock, both of Colo.

[73] Assignee: Gates Energy Products, Inc., Denver, Colo.

[21] Appl. No.: 516,418

[22] Filed: Jul. 22, 1983

[51] Int. Cl.⁴ .............................................. H01M 2/24
[52] U.S. Cl. ................................... 429/160; 429/148; 429/156; 429/157
[58] Field of Search ................. 429/97, 160, 176, 175, 429/148, 151, 156, 157

[56] References Cited

U.S. PATENT DOCUMENTS

| 729,550 | 6/1903 | Condict | 429/148 |
|---|---|---|---|
| 2,385,127 | 9/1945 | Carlile | 429/148 X |
| 3,704,173 | 11/1972 | Mclelland et al. | 429/181 X |
| 3,862,861 | 1/1975 | Mclelland et al. | 429/57 |
| 4,118,265 | 10/1978 | Hardigg | 429/176 X |
| 4,259,419 | 3/1981 | Uba et al. | 429/175 X |
| 4,346,151 | 8/1982 | Uba et al. | 429/54 |
| 4,371,591 | 2/1983 | Oxenrider et al. | 429/175 X |
| 4,383,011 | 5/1983 | Mclelland et al. | 429/54 |
| 4,390,384 | 6/1983 | Turner | 429/176 X |

FOREIGN PATENT DOCUMENTS

| 243356 | 12/1962 | Australia | 429/148 |
|---|---|---|---|
| 1065044 | 9/1959 | Fed. Rep. of Germany | 429/151 |
| 1336265 | 7/1963 | France | 429/97 |
| 840476 | 7/1960 | United Kingdom | 429/151 |

Primary Examiner—Brian E. Hearn
Assistant Examiner—Stephen J. Kalafut
Attorney, Agent, or Firm—C. H. Castleman, Jr.; H. W. Oberg, Jr.; Frank P. Grassler

[57] ABSTRACT

Electrochemical cell or battery housing modules are joined together to form an integral vibration-resistant multi-unit battery through adherence together of corresponding ribs formed on the outer walls of the modules.

24 Claims, 8 Drawing Figures

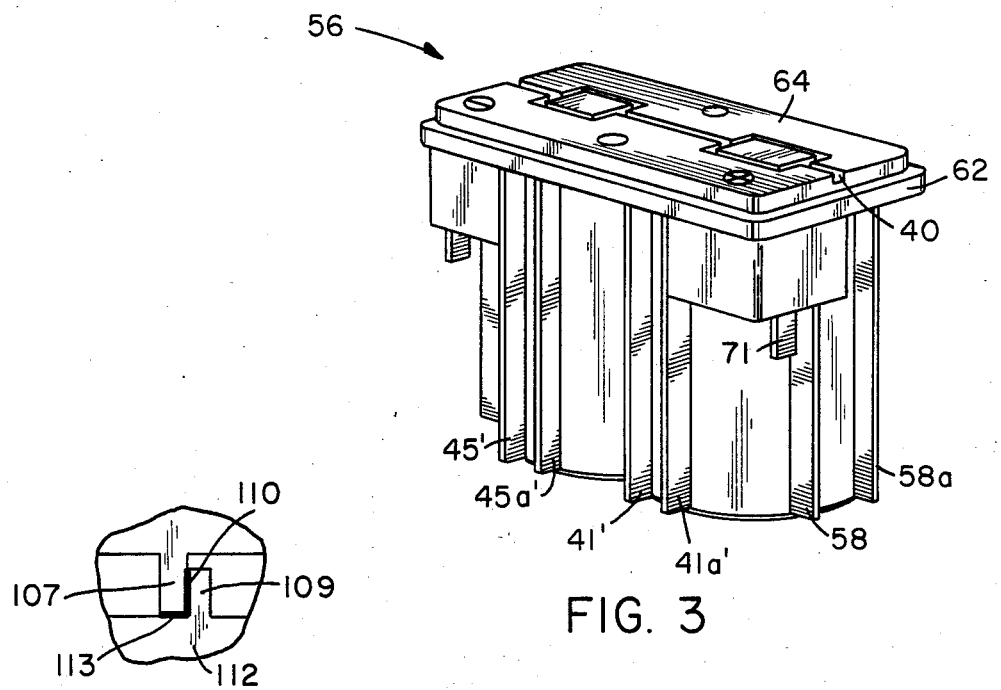
FIG. 3
FIG. 8
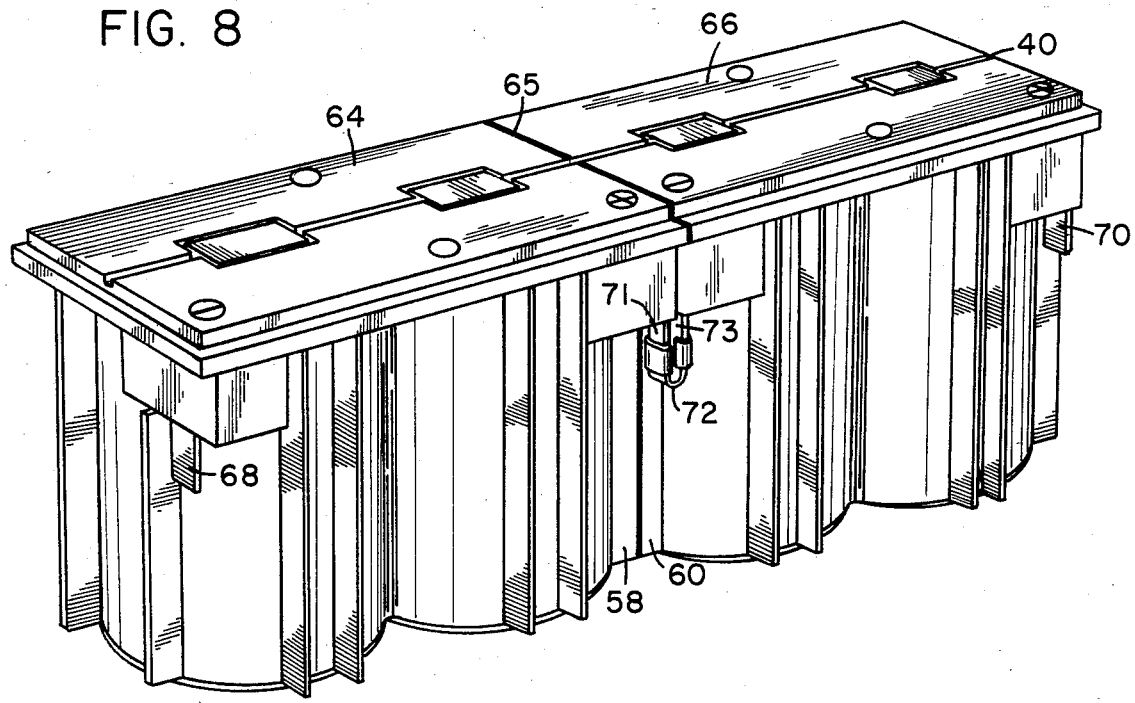
FIG. 4

VIBRATION-RESISTANT BATTERY ASSEMBLY

BACKGROUND OF THE INVENTION

This invention related to multi-unit batteries formed by attaching together cell or battery units into an integral battery assembly.

Battery modules consisting of parallelepiped containers housing a plurality of cylindrical cells have been mechanically joined together using removable inserts fitting in corresponding dovetail grooves formed at the corner of each of the modular units. In this manner, certain arrays for batteries could be joined together, and electrical connections made across the top of the containers to form a battery of increased capacity and/or voltage. The primary drawback of this known battery assembly is poor vibration resistance. The individual cylindrical cells and the straps interconnecting the cells and/or containers may be damaged in vibration unless the cells fit perfectly tight within their respective containers. Moreover, the mechanical links joining adjacent containers or modules do not provide a vibration-proof connection between the modules i.e., the interconnection is not perfectly rigid particularly along the juxtaposed faces of the sides of the parallelepiped surfaces.

The battery assembly provided for in German Pat. No. 3133773 also provides for mechanical linkages between cells, however this structure merely nests together outer ridges extending vertically on the housing sidewalls, wihout direct attachment, and places any vibration load directly on the straps interconnecting the terminals of the cells.

It is a primary object of this invention to provide a battery formed of multiple modular cell or battery housings joined together to form a rigid assembly highly resistant to vibration. It is another object to achieve such a rigid assembly directly between cell or battery monobloc units without the need to use intermediate linking members.

SUMMARY OF THE INVENTION

Briefly described, the invention embraces an integral vibration-resistant battery assembly composed of a plurality of modular cell or battery housings electrically interconnected to form a battery of increased voltage and/or capacity, characterized by providing the housings with corresponding rib members, with the rib members of adjacent housings positioned to be in abutting alignment with one another, and mutually adhered together to form a rigid assembly.

BRIEF DESCRIPTION OF THE DRAWINGS

The invention will be more particularly described in certain of its preferred embodiments in conjunction with the accompanying drawings, in which like numerals designate like parts, and in which:

FIG. 3 is a perspective view of an example of a modular battery housing in accordance with the invention;

FIG. 4 is a perspective view of two of the modules of FIG. 3 joined together end-to-end, in accordance with the invention;

FIG. 8 is a partial view of an alternative rib-joining configuration in accordance with the invention.

PREFERRED EMBODIMENTS OF THE INVENTION

The rigid battery assemblies of the invention are joined together by adherence, as opposed to the use of mechanical linking members as in the prior art. Although not so limited, the individual modules which are joined together into an assembly are preferably formed of a monobloc housing of one or more cells (battery) formed of a polymeric material, preferably a thermoplastic. The housings are rigidly joined together by providing rib members on the faces of the housing, positioning the rib members to be in abutting alignment with one another, and then adhering the ribs together preferably by such techniques as solvent bonding, regular bonding with an adhesive, and ultrasonic welding. In the most preferred embodiment the modular housings are formed of thermoplastic monoblocs with integral ribs which are heat fused (self-adhered) together to form a rigid weld.

Typical preferred thermoplastic materials useful for the modular housings especially for lead-acid batteries include polypropylene, ABS and styrene.

More than one face of the modular housing may be provided with ribs so that assemblies may be constructed by joining modules together side-by-side, end-to-end, and combinations thereof. Most preferably, any joining face of the housing is provided with at least two ribs which extend in different directions, e.g., perpendicularly to one another, to further strengthen the assembly interconnection.

Figure 1:
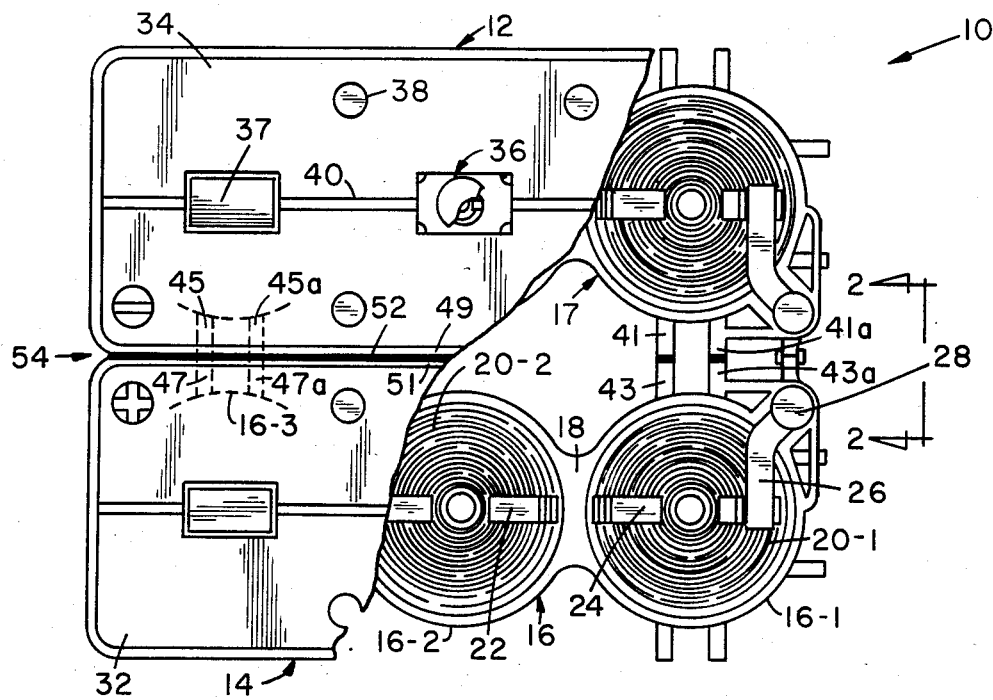
FIG. 1 is a partial cutaway, top plan view of a battery assembly formed in accordance with the invention.
Figure 2:
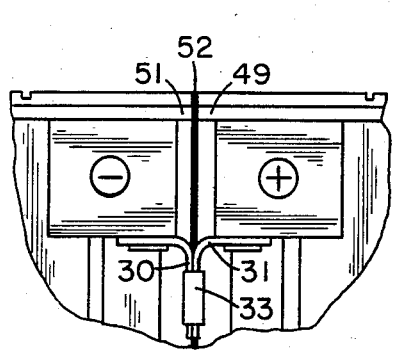
FIG. 2 is a partial side view taken along lines 2—2 of FIG. 1.

Referring now to the embodiment of FIGS. 1 and 2, there is shown generally at 10 the integral vibration-resistant battery assembly of the invention composed of two 1×3 three cell monoblocs heat fused together in side-by-side relation, to form a 2×3 battery assembly. Modular battery component housings 12 and 14 are identical, each comprising an open mouth monobloc container 16, 17 formed of three cup-shaped cell holders e.g., 16-1, -2 and -3 interconnected at mutual tangent zones 18. Spiral wound elements 20-1, 20-2, etc. fit snugly within each of the cup-shaped holder 16-1, 16-2, etc., and are formed of negative and positive plates interleaved with absorbent separator and spirally wound together. The individual cells are series connected by through-the-partition connections, for instance negative tabs 22 of element 20-2 are connected through an aperture (not shown) in tangent zone 18 to positive current collector tabs 24.

At the end of each cell the current collector tabs are welded to strap 26 which is formed integrally with post 28, which in turn is provided with an output terminal having an upstanding terminal tab 30. Details of somewhat similar component designs are illustrated in U.S. Pat No. 4,346,151 to Uba et al, in copending and commonly assigned U.S. Ser. No. 400,775, filed July 22, 1982 to Juregens, and in U.S. Pat. No. 3,704,173 to McClelland et al.

Each of the mouths of monobloc containers 16, 17 are sealed by lid closure members 32, 34 in any suitable manner, such as by heat sealing. The resultant modular battery housing is gas and electrolyte tight. Of course, both the monobloc containers and their respective lids should be made of suitable insulating and electrolyte resistant material and have sufficient strength to withstand internal gas pressure. A resealable safety valve 36, e.g., of the bunsen type, may be provided in communication with the gas space of each cell or, in the alternative, in communication with a gas space common to all of the cells of a modular battery unit, to release gas above a predetermined superatmospheric valve releasing pressure. Biasing cover 37 is positioned over the valve. The use of safety valves is most important when the modular battery units are formed of rechargeable cell types, such as a standard cylindrical nickel-cadmium or the sealed lead-acid, maintenance-free battery taught in commonly assigned U.S. Pat. Nos. 3,862,861 and 4,383,011. That particular type of lead-acid battery to which the present invention is suited, is capable of discharge and charge (including overcharge) in any attitude without electrolyte loss or significant intracell migration, and with the ability to recombine oxygen internally at high rates of efficiency.

Lid closures 32, 34 are also preferably provided with holes 38, positioned between cell elements, for mounting the battery assembly, precluding movement when the assembly is subjected to vibrational forces. The top closures are also preferably provided with longitudinal grooves 40, which allow any released gas to safely escape between the battery top and mounting surface.

In accordance with the invention, housings 12 and 14 are provided with corresponding side rib members, e.g., 41, 43 respectively, extending beyond the housing external surface, which are in abutting alignment with one another and which are mutually adhered together such as by heat fusing, bonding, welding or other adherent connection, as aforementioned. For lead-acid batteries the preferred housing material for the monobloc jars or containers 16, 17, and lid members 32, 34 is high impact polypropylene. Using this material the ribs 41, 43 (as well as adjacent rib pairs 41a, 43a) are heat fused together by a standard process in which the butting edges of the ribs are heated against a hot platen surface until melting of the material commences, and then the corresponding abutting edges of the opposing pairs of ribs e.g., 41, 43 are brought together and thereby fused (welded) into a rigid interconnection. This heat fusion step is preferably performed after the housings are fully assembled and electrically formed as working batteries.

In similar manner, rib pairs 45, 47 and 45a, 47a are fused together (simultaneously with rib members 41, 43 and 41a, 43a).

Although the aforementioned welded connection will normally provide adequate strength of course depending upon the length of the ribs and surface area of the resultant weld or bond, further assembly rigidity and hence resistance to vibration may be provided by fusing together additional rib members 49, 51. These ribs extend along the length of the top closure members 34, 32 and lie in and form a different (perpendicular) plane from side rib members 41, 43, etc. By having such lid rib members 49, 51 extend laterally beyond the edge of the corresponding monobloc sidewalls, and substantially flush with the vertically extending ribs e.g., 41, 43, it is possible to use a single platen surface to melt the vertically extending ribs as well as the top closure ribs 49, 51 and join all of the abutting rib surfaces simultaneously in a single operation. This provides a weld also along the longitudinal interface 52 where the respective lid members 32, 34 join. Although each of the welds preferably extend along the entire rib surface, clearly spot heat welding along such surface may suffice. In this respect the ribs may be discontinuous protrusions of any desired shape.

After the modular battery housings 12, 14 are heat welded together, the respective terminals 3, 31 of the battery units may be electrically interconnected at 33 to form a series connection as shown in FIG. 2. The opposite polarity output terminals will be positioned at the opposite end 54 of the assembly beneath the polarity indicia of each of lid members 32, 34.

While the embodiment of FIGS. 1 and 2 provides a 2×3 battery configuration using 1×3 building blocks, in FIGS. 3 and 4 a 1×2 modular battery housing 56 is used as the modular battery housing building block. The resultant end-to-end 1×4 assembly made from the building block of FIG. 3 is shown in FIG. 4. Similar side ribs 41', 41a', 45' and 45a' are provided (although not used to make the FIG. 4 assembly). In this embodiment end rib members 58, 58a are heat joined together with corresponding end ribs 60, etc. of the adjoining modular housing. Rib 62 extending along the end of closure member 64, and a corresponding rib on top member 66 is also heat weld welded to form weld joint 65. The resultant battery is provided with opposite polarity output terminals 68, 70, and a low impedance series connection 72 is provided between adjacently positioned terminals 71, 73 of each of the modular battery housings. In general, by positioning the output terminals along an edge and substantially at a corner of each modular housing, the interconnections such as at 33 in FIG. 2 or 72 in FIG. 4 will be very short thereby providing a low impedance connection, beneficial particularly in high drain applications.

Figure 5:
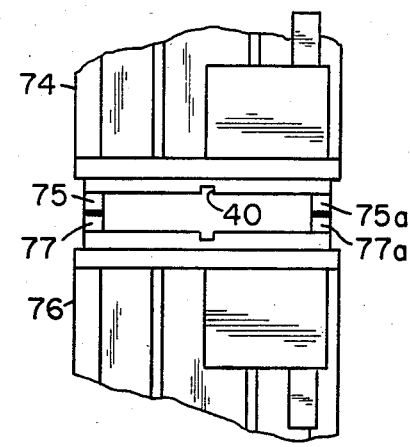
FIG. 5 depicts an alternative interconnected configuration.

An alternative top-to-top connection is shown in FIG. 5 where the lids of the modular housings, 74, 76 are provided with opposed rib pairs 75, 77 and 75a, 77a, adhered together as in the previous embodiments.

Figure 6:
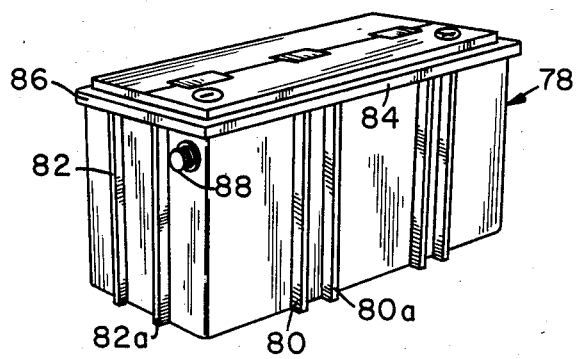
FIG. 6 is a perspective view of an alternative modular battery housing used to make up battery assemblies of the invention.

The monobloc modular housings which make up the assembly need not be formed of cylindrical cell members as in the previous embodiments. Thus, for instance, as shown in FIG. 6 the modular battery housing 78 may be parallelepiped, with parallel flat plate cell assemblies contained therein. In this embodiment similar side ribs 80, 80a and end ribs 82, 82a and lid ribs 84, 86 are provided. Again, the terminals are preferably provided at substantially the corner of the unit as shown at 88.

Figure 7:
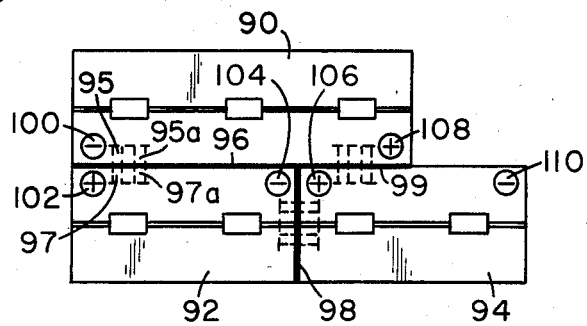
FIG. 7 is a top plan view of another battery assembly of the invention.

In FIG. 7 another illustrated example of the integral battery assembly of the invention is shown. In this example 6-volt sealed lead-acid battery 90 is joined into a rigid assembly with adjacent 4-volt modules 92, 94. The building blocks 90, 92, 94 may have any monobloc container shape such as the cylindrical shape of FIGS. 1–4 or the parallelepiped shape of FIG. 6. Clearly other shapes can also be employed. As with the previous embodiments, welds are formed between upstanding rib members e.g., 95, 97 and 95a, 97a, etc., and also preferably along the adjoining lid interfaces at 96, 98 and 99. In this particular embodiment a 14-volt assembly is formed by series connecting terminal pairs 100, 102 and 104, 106. The output terminals are shown at 108, 110.

The easiest method to adhere the modules 90, 92, 94 together is to first adhere e.g., heat weld modules 92, 94 end-to-end, and then subsequently adhere the thus formed 1×4 assembly to the 1×3 modular housing 90.

Although the rib interconnections have been illustrated as directly abutting one another, clearly other configurations may be employed, such as the side abutting configurations of FIG. 8. There ribs 107 and 109 are heat welded at interface 110. In addition the end of rib 107 may also be joined to housing 112 at interface 113, for further strength.

While certain representative embodiments and details have been shown for purposes of illustrating the invention, it will be apparent to those skilled in this art that various changes and modifications may be made therein without departing from the spirit or scope of the invention.

What is claimed is:

1. An integral vibration-resistant battery assembly comprised of a plurality of interchangeable modular cell or battery housings electrically interconnected to form a battery of increased voltage and/or capacity, characterized in that: the housings are provided with corresponding rib members formed of thermoplastic material, which protrude from the housings, and rib members of adjacent interchangeable housings are in abutting alignment with one another and are self-adhered together by heat fusion to form a substantially rigid assembly, the adjacent housings being spaced apart next to the rib members by an air gap in communication with the exterior of the assembly.

2. The battery assembly of claim 1 wherein the rib members extend substantially vertically along the sidewall of the housing.

3. The battery assembly of claim 2 wherein additional adhered together rib members are provided extending substantially perpendicularly to said vertically extending rib members.

4. A vibration-resistant battery assembly comprised of a plurality of modular interchangeable multi-cell batteries each having a monobloc jar container and a lid closing the container, the modular batteries electrically interconnected to form a battery of increased voltage and/or capacity, characterized in that:
   juxtaposed modular interchangeable batteries are provided with corresponding rib members integral with both the containers and the lids, such corresponding rib members being mutually adhered together to form a substantially rigid assembly, the adjacent modular batteries being spaced apart next to the rib members by an air gap in communication with the exterior of the assembly.

5. The assembly of claim 4 wherein the rib members integral with the lids extend substantially perpendicularly to the rib members integral with the containers.

6. The assembly of claim 5 wherein the monobloc containers are formed of substantially cylindrical cup-shaped cell holders interconnected at mutual tangent zones, and the rib members integral with the containers extend vertically along the cup-shaped cell holders.

7. An integral vibration-resistant battery assembly comprised of a plurality of thermoplastic interchangeable modular cell or battery housings electrically interconnected to form a battery of increased voltage and/or capacity, characterized in that:
   the housings are provided with corresponding rib members, which protrude from the housings, and rib members of adjacent interchangeable housings are in abutting alignment with one another and are bonded or welded together to form a substantially rigid assembly, the adjacent housings being spaced apart next to the rib members by an air gap in communication with the exterior of the assembly.

8. The battery assembly of claim 7 wherein the housings are formed of a monobloc jar container composed of interconnected cylindrical cup-shaped holders and a substantially rectangular closing lid, and rib members are positioned on said cup-shaped holders and extend generally axially thereof.

9. The battery assembly of claim 8 wherein the closing lid is provided with a peripheral rib at least along one side of said rectangle.

10. An integral vibration-resistant battery assembly comprised of a plurality of interchangeable modular cell or battery housings electrically interconnected to form a battery of increased voltage and/or capacity, characterized in that:
    the housings are provided with corresponding rib members, which protrude from the housings, and rib members of adjacent interchangeable housings are in abutting alignment with one another and are mutually adhered together to form a substantially rigid assembly, the adjacent housings being spaced apart next to the rib members by an air gap in communication with the exterior of the assembly, and the housings are provided with negative and positive terminals positioned along a common edge and substantially at respective corners of the modular housing.

11. The battery assembly of claim 10 wherein the rib members are elongated and formed of a thermoplastic, adhered together by heat fusion.

12. The battery assembly of claim 10 wherein a terminal of the self-contained cell or battery housing is positioned substantially at the corner of the housing, immediately adjacent and in close proximity to another terminal of an adjoining housing also positioned substantially at the corner of its housing.

13. The battery assembly of claim 12 wherein said terminals are electrically interconnected to form a short path.

14. An integral vibration-resistant battery assembly formed of a plurality of self-contained interchangeable modular cell or battery housings joined together, characterized in that:
    the housings are provided on their external surface with corresponding protruding rib members, at least a portion of the rib members of adjacent housings being in abutting alignment with one another and being mutually adhered together to form a substantially rigid assembly;
    the housings are provided with negative and positive terminals positioned along a common edge and substantially at respective corners of each modular housing; and
    adjacent housings are spaced apart next to the rib members by an air gap in communication with the exterior of the assembly.

15. The battery assembly of claim 14 wherein the modular cell or battery housing is composed of a monobloc jar container and a lid closing the container, and said terminals are located beneath the lid and attached to the jar container and protrude from the container less than a neighboring rib protrudes from the container.

16. The battery assembly of claim 15 wherein the terminal of one modular housing is positioned immediately adjacent and electrically interconnected to a terminal of an adjacent housing, to form a short (low impedance) connection.

17. An integral vibration-resistant battery assembly formed of a plurality of self-contained interchangeable modular cell or battery housings joined together, characterized in that:

the modular cell or battery housing is composed of a monobloc jar container formed of substantially cylindrical cup-shaped cell holders interconnected at mutual tangent zones, and a lid of substantially rectangular shape closing the monobloc jar container;

the cup-shaped housings are provided on their external surface with corresponding substantially vertically extending rib members, which protrude from the housings, at least a portion of the rib members of adjacent interchangeable housings being in abutting alignment with one another and being mutually adhered together to form a substantially rigid assembly;

the closing lid of a housing also being provided with a peripheral rib at least along one side of the rectangular lid perimeter, and such corresponding peripheral ribs of adjacent closing lids of the housings being in abutting alignment with one another and being mutually adhered together; and the housings are provided with negative and positive terminals positioned along a common edge and substantially at respective corners of each modular housing.

18. The battery assembly of claim 17 wherein adjacent housings are spaced apart next to the rib members by an air gap in communication with the exterior of the assembly.

19. The battery assembly of claim 18 wherein at least one opening is provided in the lid member of a housing, positioned in the nip between the adjacent cylindrical cup-shaped holders, thereby providing a through ventilation chamber adapted to facilitate heat dissipation via said air gap.

20. The battery assembly of claim 17 wherein the terminal of one modular housing is positioned immediately adjacent and electrically interconnected to a terminal of an adjacent housing to form a short (low impedance) connection.

21. The battery assembly of claim 17 wherein the rib members are formed of thermoplastic material, and the rib members are in direct abutment with one another and are heat welded together to form a fused connection.

22. The battery assembly of claim 17 wherein the terminals are located beneath the lid and attached to the jar container and protrude from the container less than a neighboring rib protrudes from the container.

23. The battery assembly of claim 17 wherein the jar container has side and end faces, at least one side and one end each bearing said vertically extending rib members.

24. The battery assembly of claim 17 wherein the housings have side and end faces, at least one side and one end each bearing said vertically extending rib members.

* * * * *

UNITED STATES PATENT OFFICE
CERTIFICATE OF CORRECTION

PATENT NO. : 4,592,972
DATED : June 3, 1986
INVENTOR(S) : Tristan Juergens, Hugo Tesch It is certified that error appears in the above-identified patent and that said Letters Patent are hereby corrected as shown below:

Column 1, line 5, "related" should be --relates--.
Column 1, line 32, "wihout" should be --without--.

Column 5, line 6, "configurations" should be --configuration--.

Column 6, line 41, after "short" add -(low impedance)--

Column 6, line 49, after "adjacent" add --interchangeable--.

Signed and Sealed this

Ninth Day of September 1986

[SEAL]

Attest:

DONALD J. QUIGG

Attesting Officer

Commissioner of Patents and Trademarks